United States Patent [19]

Zens et al.

[11] 4,043,420
[45] Aug. 23, 1977

[54] HIGH FREQUENCY GAS DETONATOR

[75] Inventors: René Joseph Louis Zens; William W. Horsman, both of Houston, Tex.

[73] Assignee: William W. Horsman, Houston, Tex.

[21] Appl. No.: 574,740

[22] Filed: May 5, 1975

[51] Int. Cl.$^2$ ............................................. G01V 1/38
[52] U.S. Cl. ..................................... 181/117; 181/118
[58] Field of Search ............... 181/113, 117, 118, 401, 181/402; 340/17

[56] References Cited

U.S. PATENT DOCUMENTS

| | | | |
|---|---|---|---|
| 3,260,327 | 7/1966 | McCollum | 181/117 |
| 3,361,226 | 1/1968 | Szasz | 181/117 |
| 3,401,769 | 9/1968 | Kilmer | 181/117 |

*Primary Examiner*—Howard A. Birmiel
*Attorney, Agent, or Firm*—Michael P. Breston

[57] ABSTRACT

A high-frequency, high-repetition gas detonator is provided which is adapted for shallow seismographic work. The detonator comprises a detonation chamber, a rigid bottom plate adapted to be coupled to the earth, and a top plate positioned over the bottom plate. A plurality of springs resiliently hold the plates together whereby the bottom plate covers a bottom vent port in the chamber when the plates engage. The bottom plate opens the chamber to the surrounding medium when the plates disengage. Fluid conduit means communicate with the interior of the chamber for supplying thereto a pressurized detonating fluid. Means are provided for detonating the fluid thereby causing the bottom plate to move downward and separate from the top plate. The compressive force of the bottom plate sends a downward seismic pulse into the underlying layers of the earth. The products of detonation from the detonation chamber are vented outside through the cavity formed between the top and bottom plates when the plates are separated. The compressed springs force the plates to get together thereby closing the vent port.

2 Claims, 8 Drawing Figures

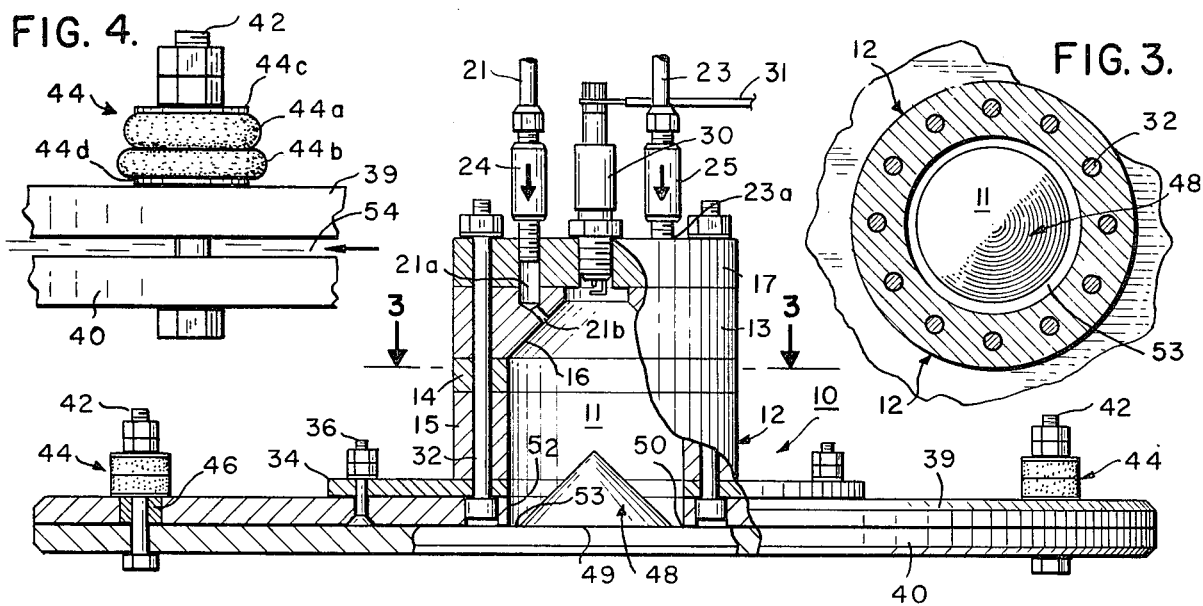

HIGH FREQUENCY GAS DETONATOR

BACKGROUND OF THE INVENTION

Seismic energy sources can roughly be classified into sources that produce high-energy, low-frequency (say 2 to 30 Hz) acoustic pulses and those that produce low-energy, high-frequency (say 600to 7000 Hz) acoustic pulses. Since the earth attenuates high-frequency signals, only low-frequency sources are used for deep-penetration, low-resolution seismic work. The high-frequency sources are used for shallow-penetration, high-resolution work.

Various low-frequency seismic sources using gas exploders have been proposed in the literature and several such gas exploders have been successfully employed commercially. Perhaps the most widely used gas exploder is of the type described in U.S. Pat. No. 3,235,027 of L. G. Kilmer. This patent and several others of Kilmer describe a DYNOSEIS® gun.

Kilmer's gas exploder essentially comprises a rigid top positioned over a rigid bottom and a vertical extensible sidewall joins the top and bottom to enclose a chamber therebetween. The chamber accepts a combustible gas mixture which is ignited to produce a combustion in the chamber. The energy from the combustion strikes the bottom and extends the side wall. The bottom moves relative to the top and transmits an acoustic signal into the earth. The gas products of combustion are vented from the combustion chamber by an exhaust valve.

The chief similarities between Kilmer's gas exploder and applicants' detonator are: both include a top and a bottom, both ignite a fuel in a chamber to produce downward movement of the bottom. The chief differences are: applicants use a detonating fuel which has a flame velocity very much greater than the flame velocity of the combustible gas of Kilmer; applicants have no extensible vertical sidewall between the top and bottom, so that their products of detonation can be directly flushed out from the detonation chamber through the cavity which is formed following a detonation, by the volume confined between the disengaged top and bottom plates. Other differences between Kilmer's exploder and applicants' detonator relate to the methods of energization and details of construction which will become apparent from the subsequent description.

For high-resolution profiling used in shallow seismic work, all known commercial acoustic energy sources use transducers for converting electric energy into acoustic energy. Unfortunately, the efficiency of such electrically-operated transducers is very low, on the order of 1% or less. This is so because the primary fuel is typically used to first power a diesel engine that drives an AC alternator whose output is converted into DC energy which is converted by the transducer to acoustic energy. Thus, even a portable electrically-operated transducer requires bulky and heavy auxiliary equipments which make the overall system inefficient and limited to special applications. The main advantage of such electric transducers is that they can be operated at high repetition rates.

Accordingly, it is an important object of the present invention to provide a new and improved high-frequency, high-repetition rate acoustic energy source which is relatively lightweight.

It is another object of this invention to provide such a new and improved high-frequency acoustic source which directly converts energy produced by fuel detonation into acoustic energy.

It is a further object of this invention to provide a new and improved mechanical, high-efficiency, high-frequency, high-repetition rate acoustic source which uses the energy provided by a detonating fuel to mechanically strike a member which transmits an acoustic pulse into the ground.

To obtain a relatively-high repetition rate with a fuel transducer, it is essential that the gas products of detonation be flushed out as fast as possible and this is accomplished in accordance with the invention by providing an interplate cavity of large area which directly communicates with the vent port of the detonation chamber.

SUMMARY OF THE INVENTION

In one preferred embodiment, the detonator of this invention comprises a rigid circular bottom plate adapted to be coupled to the earth, a rigid annular top plate is positioned over the bottom plate, a detonation chamber is positioned over the top plate and has a bottom vent port communicating with the hole in the annular top plate. The port is closed when the top and bottom plates are engaged and the port is opened when the plates are disengaged. A plurality of resilient springs, mounted on bolts which are circumferentially disposed near the edges of the plates, resiliently urge the plates together. Means external to the detonator controllably feed fuel into the chamber, and ignition means periodically detonate the fuel in the chamber. The shock wave of detonation impinges directly against the bottom plate, thereby compressing the resilient springs and causing the bottom plate to move downwardly relative to the top plate whereby a cylindrical cavity is created between the plates. The products of detonation are flushed out to the surrounding medium through this cavity. Since the flame velocity of the detonating fuel is very great, and the large-volume cavity allows substantially instantaneous flushing of the detonation products from the chamber, the detonator can be operated at relatively-high repetition rates and yet produce acoustic pulses having sufficient amplitude and frequency for high-resolution profiling work.

BRIEF DESCRIPTION OF THE DRAWINGS

FIG. 1 is an elevation view of a fuel detonator constructed in accordance with the invention, partly in section;

FIG. 2 is a plan view of the detonator shown in FIG. 1;

FIG. 3 is a sectional view on line 3—3 in FIG. 1;

FIG. 4 is a fragmentary enlarged view illustrating the separation of the plates and the cavity therebetween;

DESCRIPTION OF PREFERRED EMBODIMENTS

Figure 5:
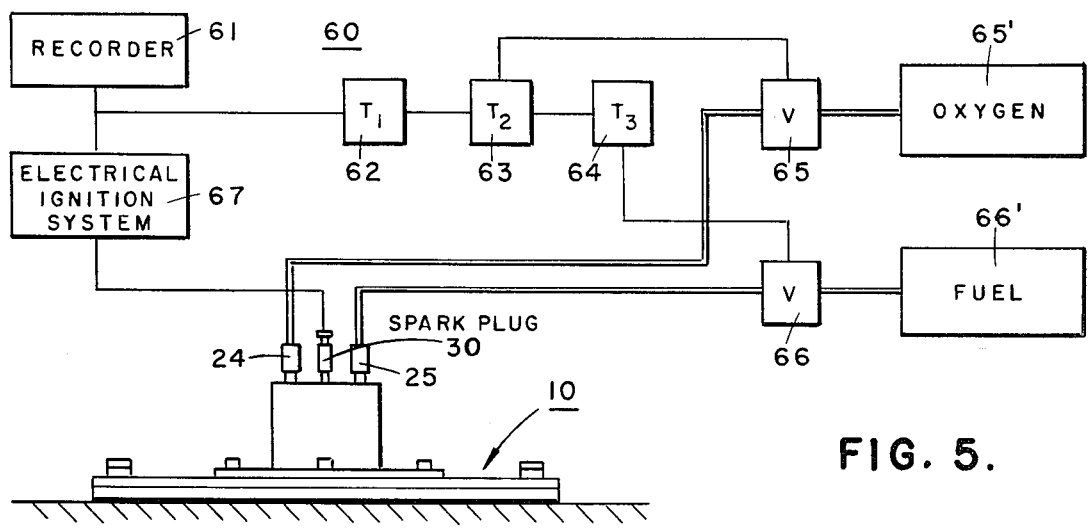
FIG. 5 is a schematic representation of the fuel supply system used to energize the detonator of FIG. 1.
Figure 6:
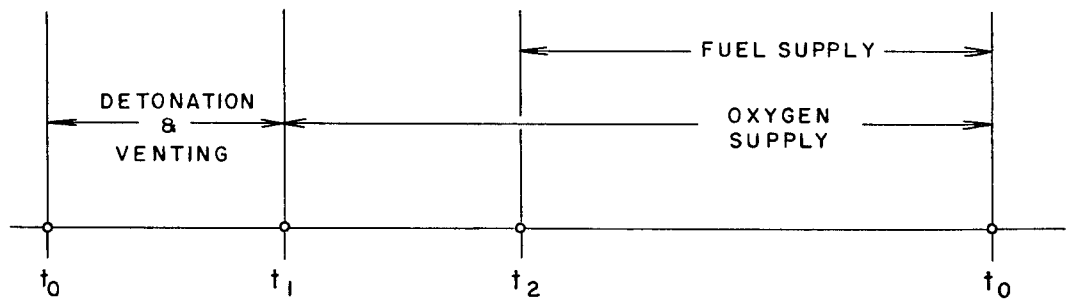
FIG. 6 is a timing diagram of the supply system shown in FIG. 5.

Referring to the drawings and more particularly to FIGS. 1 through 4, there is shown a preferred construction of the detonator of the present invention, generally designated as 10, for generating into the ground a series of acoustic pulses. The detonator includes a detonation chamber 11 formed inside a housing, generally designated as 12. Housing 12 is preferably made of cylindrical construction and made up from one or more annular sections. Three such sections 13–15 are illustrated in the drawings. The volume of chamber 11 determines the amplitude and frequency of the acoustic pulse produced by detonator 10. Sections 14 and 15 have substantially equal internal and external diameters. Section 13 has the same external diameter but is provided internally with an outwardly sloping conical surface 16 to improve the velocity propagation characteristics of chamber 11. A solid cylindrical cover 17 closes chamber 11. An oxidizer fluid such as oxygen is supplied to an input line 21 and a fuel is supplied to an input line 23. Input line 21 is coupled to an inlet 21a and input line 23 is coupled to an inlet 23a in cover 17. Lines 21, 23 respectively, include check valves 24, 25 to prevent the detonation flames from becoming transmitted to the gas sources. Inlet 21a communicates with a small-diameter bore 21b. Inlet 23a is similarly coupled to chamber 11 through a small diameter bore. The function of the bore 21b is to effectively stop the detonation shock waves from becoming transmitted to its associated check valve 24.

A spark plug 30 is provided in cover 17 for receiving an electric pulse on an ignition line 31. The electrodes of the spark plug are exposed to the internal volume of the detonation chamber 11.

Housing 12 is held together by a plurality of bolts 32 and by an annular flange 34. Flange 34 is secured to a top plate 39 by a plurality of a circumferentially arranged bolts 36. A rigid circular, solid bottom plate 40, of the same external diameter as annular top plate 39, is secured to plate 39 by a plurality of circumferentially arranged bolts 42 having resilient springs 44 mounted thereon. Springs 44 may be made of rubber so that they can withstand salt water and have a long operating life. Each bolt 42 passes through a sleeve bushing 46 extending through the thickness of plate 39. Bushing 46 serves as a sleeve bearing. Each spring 44 may comprise a top hard rubber ring 44a, a soft bottom rubber ring 44b, a top washer 44c, and a bottom washer 44d.

If the detonator 10 of this invention is intended for work in a body of water, it is preferred to provide at the center of the bottom plate 40 a conical member 48 having a diameter at its base 49 which is slightly less than the inner diameter of the vent port 50 formed by center bore 52 in annular plate 39. With cone 48 water leakage into the detonation chamber 11 will be restricted to an annular zone 53 near the edge of bore 52 for reasons subsequently explained. When the bottom plate 40 moves away from top plate 39, there is formed a cylindrical cavity 54 between the plates (FIG. 4).

In FIG. 5 is shown a typical supply system 60 for the detonator 10 of this invention. System 60 comprises a recorder 61, three timers, 62–64, a solenoid-operated oxygen valve 65, and a solenoid-operated fuel valve 64. Oxygen supply valve 65 is connected to a source of oxygen 65'. Fuel valve 66 is connected to a fuel source 66'. Recorder 61 supplies a trigger pulse to timer 62 and to an electric ignition system 67 which feeds spark plug 30.

The operation of the detonator will be explained with reference to FIGS. 1–6. Recorder 61 which may be a magnetic recorder having a continuous loop which supplies at time $t_0$ (FIG. 6) a trigger pulse to the ignition system 67 and hence to the spark plug 30 which detonates the fuel mixture inside detonation chamber 11. The detonation shock wave moves down from sloping wall 16 to the vent port 50. The shock wave strikes the bottom plate 40 causing it to compress springs 44 and separate from the top plate 39. The products of detonation are vented to the surrounding medium from the vent port 50 through the inter-plate cavity 54. At $t_0$ the same trigger pulse is supplied to timer 62 which runs for a period $t_1$. At $t_1$ timer 62 applies a pulse to timer 63 which opens valve 65. Oxygen flows into detonation chamber 11 until the next shot at time $t_0$. At time $t_2$ following $t_1$, timer 63 sends a signal to timer 64 which opens valve 66. The desired fuel from source 66' is a fuel (liquid or gas) that can with the right mixture of oxidizer reach detonation, i.e. very high flame velocities. The fuel employed in the preferred embodiment is acetylene mixed with oxygen at a pressure of 50 psi. The fuel flows into chamber 11 from $t_2$ until time $t_0$ whereat the chamber is fully pressurized and charged. At time $t_0$ all valves close, a new trigger pulse will be supplied to plug 30 and the cycle will repeat.

Following the violent separation of the bottom plate 40 from the top plate 39, the springs 44 are placed in compression because the pressure inside the detonation chamber 11 becomes considerably greater than the total pressure supplied by the springs. When the pressure in the chamber tapers off to the pressure supplied by springs 44, the inter-plate cavity 54 will collapse following the re-engagement of plates 39 and 40.

The springs have the desired characteristic that the closure of plates 39, 40 will not be followed by chatter so that a clean downward pulse is produced by the bottom plate 40 against the underlying medium typically earth or water. By using a high flame velocity fuel and by allowing a large volume cavity 54 to vent the products of detonation, very fast repetition rates can be achieved. For example, one complete cycle of operation can be effected in less than one-half of a second. The amplitude and frequency of the acoustic downward pulse produced by detonator 10 can be varied by varing outer diameter of plates 40, the length of housing 12, and the oxygen-to-acetylene ratio. Up to the saturation ratio, the higher the ratio is the greater will be the flame velocity of the detonation fuel mixture.

Even when detonator 10 is submerged in a body of water, during operation water will be prevented from entering into vent port 50 by the gas pressure inside detonation chamber 11. When the detonator is not being operated, the oxygen source is allowed to continuously feed into chamber 11 so as to prevent water from leaking through the space between plates 39 and 40 since no seal therebetween is provided. Such leakage would otherwise be possible even with accurately-machined, flat plate surfaces. Any leakage water that may leak between the plates will accumulate in annular space 53. The high pressure resulting from each detonation pushes the leakage water out of the detonator through cavity 54. By keeping the leakage water on the edge of vent port 50 in space 53, cone 48 facilitates the water purging. For land work cone 48 is not required and even for marine work the cone is not essential.

Figure 7:
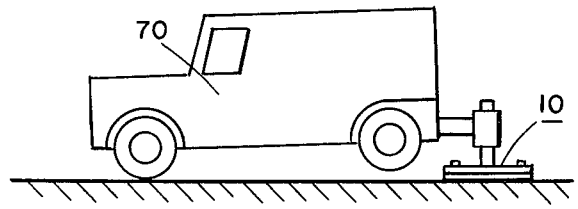
FIG. 7 illustrates the use of the detonator for land geophysical work.
Figure 8:
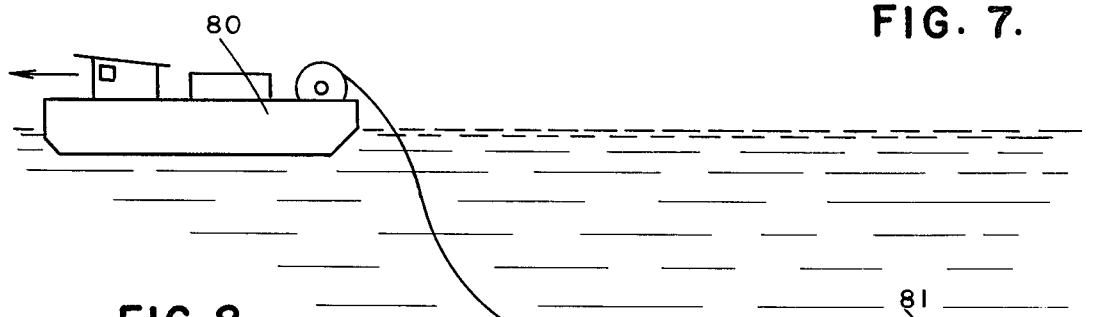
FIG. 8 illustrates the use of the detonator for marine work.

In use the detonator may be coupled to the rear end of a truck 70 (FIG. 7) and carried from location to location to do high-resolution profiling work, or it may be towed by a vessel 80 (FIG. 8) on a fish 81, as is conventional in such land or marine seismic work. Acoustic energy sources are conventionally mounted at the rear end of trucks and the mounting means are well known. However, with the use of the detonator of this invention electricity-producing machinery, such as diesel engines, alternators, etc., are no longer required. In their stead are only provided one or more tanks of oxygen and acetylene. Thus light-weight vehicles can now be utilized.

While this invention has been described in connection with preferred embodiments and applications, it is not limited thereto and modifications will readily suggest themselves to those skilled in the art and it is intended that all such modifications and applications fall within the scope of the claims attached hereto.

What is claimed is:

1. A detonator comprising:
    a bottom plate adapted to be coupled to a medium,
    a top plate positioned over said bottom plate, said top plate having a bore;
    a plurality of springs interconnecting and resiliently urging the plates toward and against each other;
    a housing defining a detonation chamber having a bottom vent port opposite to and communicating with said bore, said housing being mounted above said top plate, whereby said bore is normally closed by said bottom plate;
    fluid inlet means communicating with said chamber for admitting a charge of detonating fluid into said chamber, and
    means for detonating the fluid inside said chamber, thereby causing a momentary separation of and the formation of a cavity between said plates, and said vent port exhausting the gaseous products of combustion from said chamber through said cavity to the ambient medium.

2. A fluid exploder comprising:
    a rigid bottom plate having a top surface;
    a rigid top plate having a bottom surface and a center bore;
    spring means interconnecting and resiliently urging said plates toward and against each other;
    a housing mounted over said top plate and defining an enclosed internal combustion chamber having an inlet for admitting a combustible fluid and a vent port for communicating with said center bore, said vent port being normally closed by said top surface of said bottom plate, when said top and bottom surfaces are juxtaposed with no separation therebetween; and
    means for detonating said fluid, the substantially instantaneous pressure rise in said chamber producing a momentary separation of and the establishment of a cavity between said surfaces of said plates, said cavity allowing the escape of the gaseous products of combustion from said chamber outwardly of said exploder.

* * * * *